United States Patent
Piret et al.

(12) 
(10) Patent No.: US 6,400,726 B1
(45) Date of Patent: Jun. 4, 2002

(54) ALLOCATION TO A PLURALITY OF ELEMENTS OF AUTHORIZATIONS FOR ACCESS TO A SHARED RESOURCE

(75) Inventors: Philippe Piret, Cesson-Sevigne; Pascal Rousseau, Rennes, both of (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/997,335

(22) Filed: Dec. 24, 1997

(30) Foreign Application Priority Data

Jan. 22, 1997 (FR) .......................................... 97 00633

(51) Int. Cl.$^7$ ..................... H04L 12/413; H04L 12/43
(52) U.S. Cl. ........................................ 370/449; 370/461
(58) Field of Search ............................... 370/346, 348, 370/321, 322, 461, 431, 449, 458, 453, 454, 457, 459, 447, 448, 337, 336, 349; 340/825.08

(56) References Cited

U.S. PATENT DOCUMENTS

| 4,340,961 | A |   | 7/1982 | Capel et al. ............... 370/85 |
| 4,590,468 | A | * | 5/1986 | Stieglitz ................ 340/825.5 |
| 5,394,436 | A | * | 2/1995 | Meier et al. .............. 370/202 |
| 5,430,732 | A | * | 7/1995 | Lee et al. ................. 370/449 |
| 5,436,905 | A | * | 7/1995 | Li et al. .................. 370/346 |
| 5,613,198 | A | * | 3/1997 | Ahmadi et al. ............ 370/337 |

FOREIGN PATENT DOCUMENTS

| EP | 0357992 | 3/1990 |
| EP | 0592027 | 4/1994 |
| WO | 9416534 | 7/1994 |
| WO | 9635276 | 11/1996 |

OTHER PUBLICATIONS

Computer Networks and ISDN Systems, vol. 26, No. 6/08, Mar. 1, 1994, pp. 711–719, XP000434911, Conti M et al: E–DCP, An Extension of The Distributed–Control Polling MAC Protocol (DCP) for Integrated Services.
Proceedings of the Annual Computers in Design, Manufacturing and Production Conference (COMPEURO), Paris–Evry, May, 24, 1993, No. —May 24, 1993, Croisier A; Israel M; Chavand F, pp. 452–460, XP000463900 Raja P et al. "Priority Polling and Dynamic Time–Window Mechanisms in a Multicycle Fieldbus".

* cited by examiner

Primary Examiner—Chau Nguyen
Assistant Examiner—Chiho Andrew Lee
(74) Attorney, Agent, or Firm—Fitzpatrick, Cella, Harper & Scinto

(57) ABSTRACT

The invention proposes a method for allocating, to a plurality of elements, authorisations for access to a shared resource, including the step (E4) of storing the address of elements capable of accessing the shared resource, characterised in that it includes the steps of determining (E6), for the plurality of elements, a number (TTJ) of authorisations for access to the resource, the said authorisations together forming a cycle, then successively assigning (E8, E80) each of the said authorisations to the elements, during the said cycle, an access authorisation being assigned to an element according to at least the number of times the element under consideration accessed the resource during the preceding cycle, and finally storing (E88, E890) the number of times each element accesses the resource during the said cycle.

29 Claims, 13 Drawing Sheets

LS1

| k | ADR$_n$ | MRX$_n$ | JTX$_n$ | ACT$_n$ |
|---|---|---|---|---|
| 1 | A | 4 | 2 | 0 |
| 2 | B | 3 | 1 | 0 |
| 3 | C | 2 | 0 | 0 |
| 4 | D | 1 | 0 | 0 |

| k | ADR$_n$ | MRX$_n$ | RM$_n$ | JTX$_n$ | ACT$_n$ |
|---|---|---|---|---|---|
| 1 | A | 3 | 1 | 2 | 0 |
| 2 | B | 1 | 2 | 1 | 0 |
| 3 | C | 2 | 0 | 0 | 0 |
| 4 | D | 1 | 0 | 0 | 0 |

| k | $ADR_n$ | $MRX_n$ | $JTX_n$ | $JGM_n$ | $ACT_n$ |
|---|---------|---------|---------|---------|---------|
| 1 | A | 4 | 2 | 2 | 0 |
| 2 | B | 3 | 1 | 1 | 0 |
| 3 | C | 2 | 1 | 0 | 0 |
| 4 | D | 1 | 0 | 0 | 0 |

| k | $ADR_n$ | $MRX_n$ | $RM_n$ | $JTX_n$ | $JGM_n$ | $ACT_n$ |
|---|---------|---------|--------|---------|---------|---------|
| 1 | A | 3 | 1 | 2 | 2 | 0 |
| 2 | B | 2 | 1 | 1 | 1 | 0 |
| 3 | C | 2 | 0 | 1 | 0 | 0 |
| 4 | D | 1 | 0 | 0 | 0 | 0 |

Fig. 7D

ALLOCATION TO A PLURALITY OF ELEMENTS OF AUTHORIZATIONS FOR ACCESS TO A SHARED RESOURCE

The present invention concerns in general the allocation to a plurality of elements of authorisations for access to a shared resource, so as best to adapt the sharing of the resource to the requirements of each element.

The invention applies notably to the sharing of a communication channel between communication means, for example the sharing of the passband of a radio channel between the mobile stations of a local wireless network.

In this context, the passband requirements of a mobile station vary considerably with time, notably according to the type of data to be transmitted (data, voice, image).

A predetermined fixed allocation of access authorisations would be not very effective since the traffic variations would not be taken into account.

Allocation of access authorisations must therefore be adapted to the requirements of each mobile station.

A known type of access authorisation allocation is a polling protocol. This technique makes it possible to achieve high throughputs, but with waiting times, or latencies, which may be large, that is to say a mobile station is liable to wait before accessing the resource, which prejudices the "fluidity" of the traffic.

Another access protocol is a contention, or conflict, protocol, in which a number of mobile stations are liable to transmit data simultaneously on the shared channel. This type of protocol therefore has a risk of collision. The latencies are generally small, but the throughputs are also lower than with a polling protocol.

Document EP-0 621 708 proposes notably an adaptive protocol for controlling access to a transmission medium which combines these two techniques. The protocol is based on a reservation scheme for the data traffic (polling) and a random access technique for the control and signalling traffic (contention).

A fixed time division frame structure consists of three periods. The first period is reserved exclusively for the transfer of data from the base station to the remote stations. The second period is used for the transfer of data from the remote stations to the base station.

The third period is the control channel, used for the transmission of reservation requests and data from the remote stations to the base station according to a random access contention mode.

The allocation of time intervals in the first two periods is made by the base station, according to the reservation requests made during the third period.

The risk of frame collision is not zero since, in the third period, the reservation request and data transmissions are carried out according to a random access mode. If it is wished to be free from the risk of collision, it is necessary to implement a collision detection mechanism, which is generally complex.

Furthermore, because of the three-period frame structure, a mobile station must wait until it has transmitted its reservation request before being capable of accessing the shared resource, in this case the second period.

The present invention aims to remedy the drawbacks of the prior art by providing a method and a device for allocation to a plurality of elements of authorisations for access to a shared resource, which allows throughputs comparable to those of the polling technique, while having latencies of the order of those of the contention technique.

To this end, the invention proposes a method for allocating, to a plurality of elements, authorisations for access to a shared resource, including the step of storing the address of elements capable of accessing the shared resource, characterised in that it includes the steps of:
  determining, for the said plurality of elements, a number of authorisations for access to the resource, the said authorisations together forming an access cycle,
  successively assigning each of the said authorisations to the elements during the said cycle, an access authorisation being assigned to an element according to at least the number of times the element under consideration accessed the resource during the preceding cycle, and
  storing the number of times each element accesses the resource during the said cycle.

Correlatively, the invention concerns a device for allocating, to a plurality of elements, authorisations for access to a shared resource, having a memory means for storing the address of elements capable of accessing the shared resource, characterised in that it has:
  means for determining, for the said plurality of elements, a number of authorisations for access to the resource, the said number of authorisations forming an access cycle,
  means for successively assigning each of the said authorisations to the elements, during the said cycle, an access authorisation being assigned to an element according to at least the number of times the element under consideration accessed the resource during the preceding cycle, and
  means for storing the number of times each element accesses the resource during the said cycle.

The method and the device apply particularly where the elements are data communication means, and the shared resource is a communication channel. The plurality of elements considered is the set of elements which are capable of accessing the shared resource.

The method and the device according to the invention have not only the advantage of solving the technical problem described above, but also that of avoiding any risk of collision, since they are based on a polling protocol.

The invention also concerns a device for allocating, to a plurality of elements, authorisations for access to a shared resource, adapted to cooperate with a memory means for storing the address of elements capable of accessing the shared resource, characterised in that it has logic means having:
  means for determining, for the said plurality of elements, a number of authorisations for access to the resource, the said authorisations together forming an access cycle,
  means for successively assigning each of the said authorisations to the elements, during the said cycle, an access authorisation being assigned to an element according to at least the number of times the element under consideration accessed the resource during the preceding cycle, and
  means for cooperating with memory means adapted to store the number of times each element accesses the resource during the said cycle.

According to preferred embodiments, possibly combined:
  the number of access authorisations is determined according to the sum of the number of accesses to the shared resource which each element made during the preceding cycle,
  the number of access authorisations depends on the sum of the number of accesses which each element had still to make at the end of the preceding cycle.

Advantageously, the number of access authorisations is limited at a lower value by a value dependent on the number of elements capable of accessing the resource. Thus the cycle has a sufficient length so that all the elements can access the shared resource during one cycle.

According to a first preferred embodiment, the number of access authorisations is weighted by a weighting factor which depends on the sum of the number of accesses to the shared resource which each element made during the preceding cycle.

According to a second preferred embodiment, the number of access authorisations is weighted by a weighting factor which depends on the sum of the number of accesses to the shared resource which each element made during the preceding cycle, and the number of accesses which each element had still to make at the end of the preceding cycle.

Advantageously, determination of the number of access authorisations is carried out between two cycles, which makes it possible to regularly adapt the length of the cycle to the requirements of the elements.

In order to simplify the implementation, the number of authorisations for access to the resource may be predetermined.

In general, the assigning of an access authorisation includes comparing the elements according to a criterion which depends on the number of authorisations previously assigned to each element during the said cycle, and the number of times each element accessed the resource during the preceding cycle.

According to a first preferred embodiment, the assigning of each access authorisation includes:
  calculating, for each element, the ratio between the number of access authorisations previously assigned to the said element during the current cycle, and the number of accesses to the shared resource which the said element made during the preceding cycle,
  comparing the ratios calculated previously,
  assigning the access authorisation to the element for which the ratio is the smallest.

According to a second preferred embodiment, the assigning of each access authorisation includes:
  calculating, for each element, the ratio between the number of access authorisations previously assigned to the said element during the current cycle, and the sum of the number of accesses to the shared resource which the said element made during the preceding cycle and the number of accesses which the said element had still to make at the end of the preceding cycle,
  comparing the ratios calculated previously,
  assigning the access authorisation to the element for which the ratio is the smallest.

According to a third preferred embodiment, the assigning of each access authorisation includes:
  calculating, for one of the elements, a first ratio between the number of access authorisations previously assigned to the said element during the current cycle, and the number of accesses to the shared resource which the said element made during the preceding cycle,
  calculating, for the said element, a second ratio between the number of access authorisations previously assigned to the elements of a group not including the said element, during the current cycle, and the number of accesses to the shared resource which the said elements of the group made during the preceding cycle,
  comparing the first and second ratios calculated previously,
  assigning the access authorisation to the said element if the first ratio is less than the second ratio or, if not, reiterating the preceding steps for another element selected from the group.

According to a fourth embodiment, the assigning of each access authorisation includes:
  calculating, for one of the elements, a first ratio between the number of access authorisations previously assigned to the said element during the current cycle, and the sum of the number of accesses to the shared resource which the said element made during the preceding cycle and the number of accesses which the said element had still to make at the end of the preceding cycle,
  calculating, for the said element, a second ratio between the number of access authorisations previously assigned to the elements of a group not including the said element, during the current cycle, and the difference between the number of accesses to the shared resource which the said elements of the group made during the preceding cycle, and the number of accesses which the said element had still to make at the end of the preceding cycle,
  comparing the first and second ratios calculated previously,
  assigning the access authorisation to the said element if the first ratio is less than the second ratio or, if not, reiterating the preceding steps for another element selected from the group.

The group includes elements which previously accessed the resource during the preceding cycle a number of times fewer than that of the said element.

The calculations necessary for assigning access authorisations are preferably distributed over the whole of the current cycle; thus there is no calculation time between two consecutive cycles.

According to other characteristics, the method also includes the steps of
  broadcasting invitations to declare oneself to the elements,
  receiving a reply from an element capable of accessing the shared resource and of which the address is not stored, and
  storing the address of the said element.

The method also includes the step of
  deleting from the memory the address of elements for which the number of accesses to the shared resource is zero for a specific number of consecutive cycles.

The device according to the invention has corresponding means; these characteristics make it possible to add or remove elements of the set of elements capable of accessing the shared resource.

The characteristics and advantages of the present invention will emerge more clearly from a reading of a number of preferred embodiments illustrated by the accompanying drawings, in which:

FIGS. 7A, 7B, 7C and 7D are lists, according to four embodiments of the invention, of mobile stations controlled by the base station;

Figure 1:
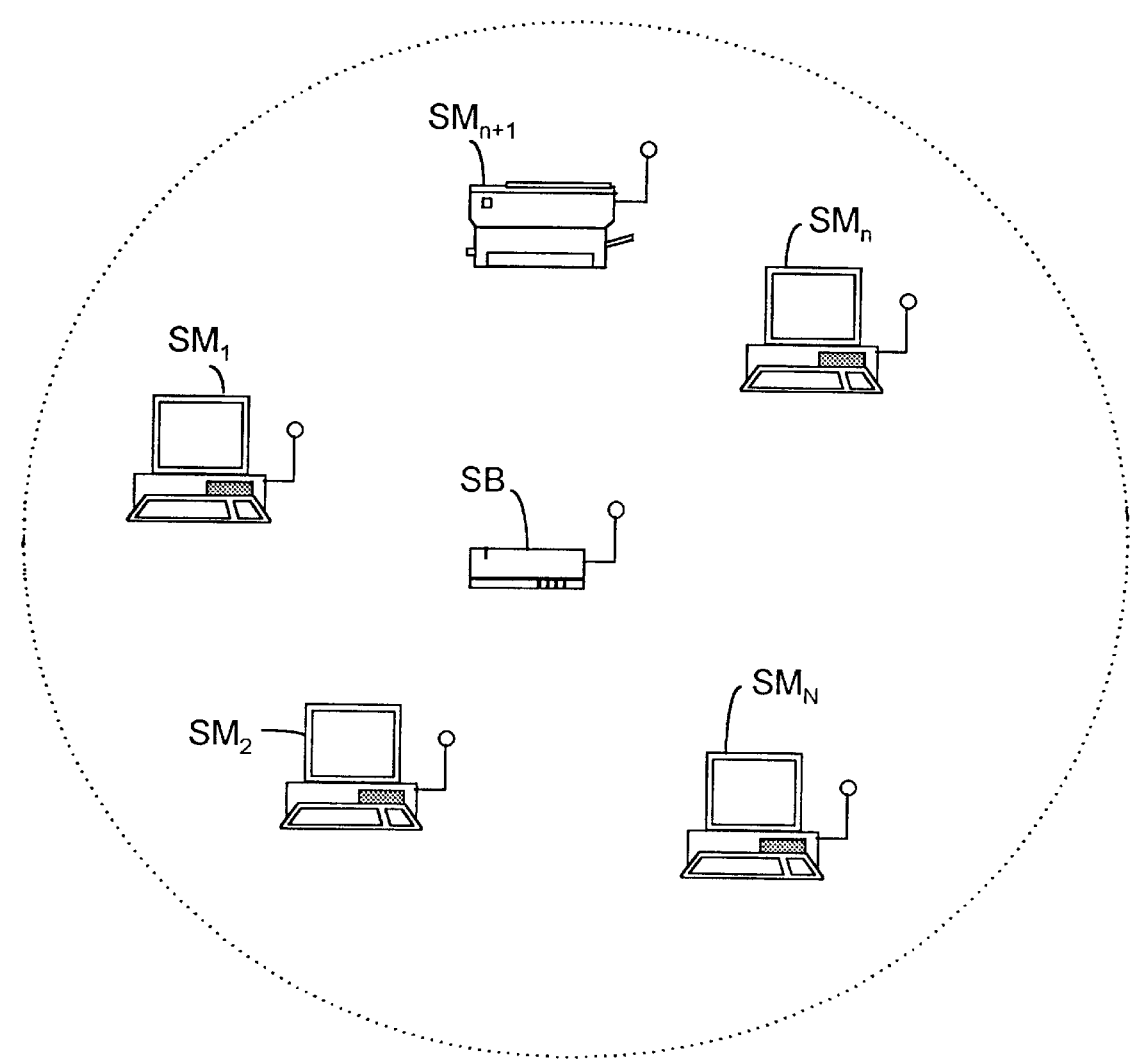
FIG. 1 depicts a local wireless network implementing the invention.
Figure 2:
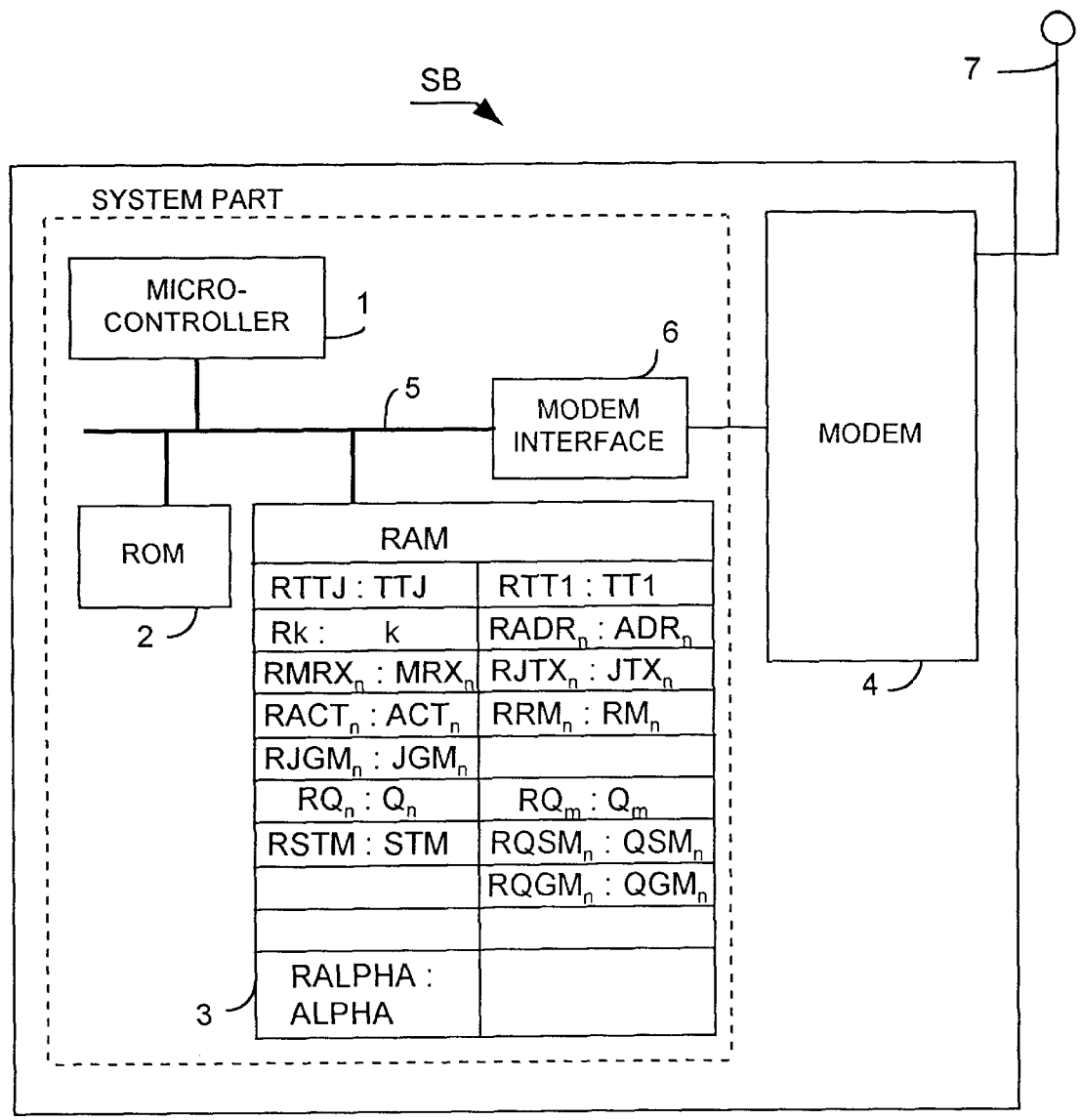
FIG. 2 is a block diagram of a base station included in the local network of FIG. 1.
Figure 3:
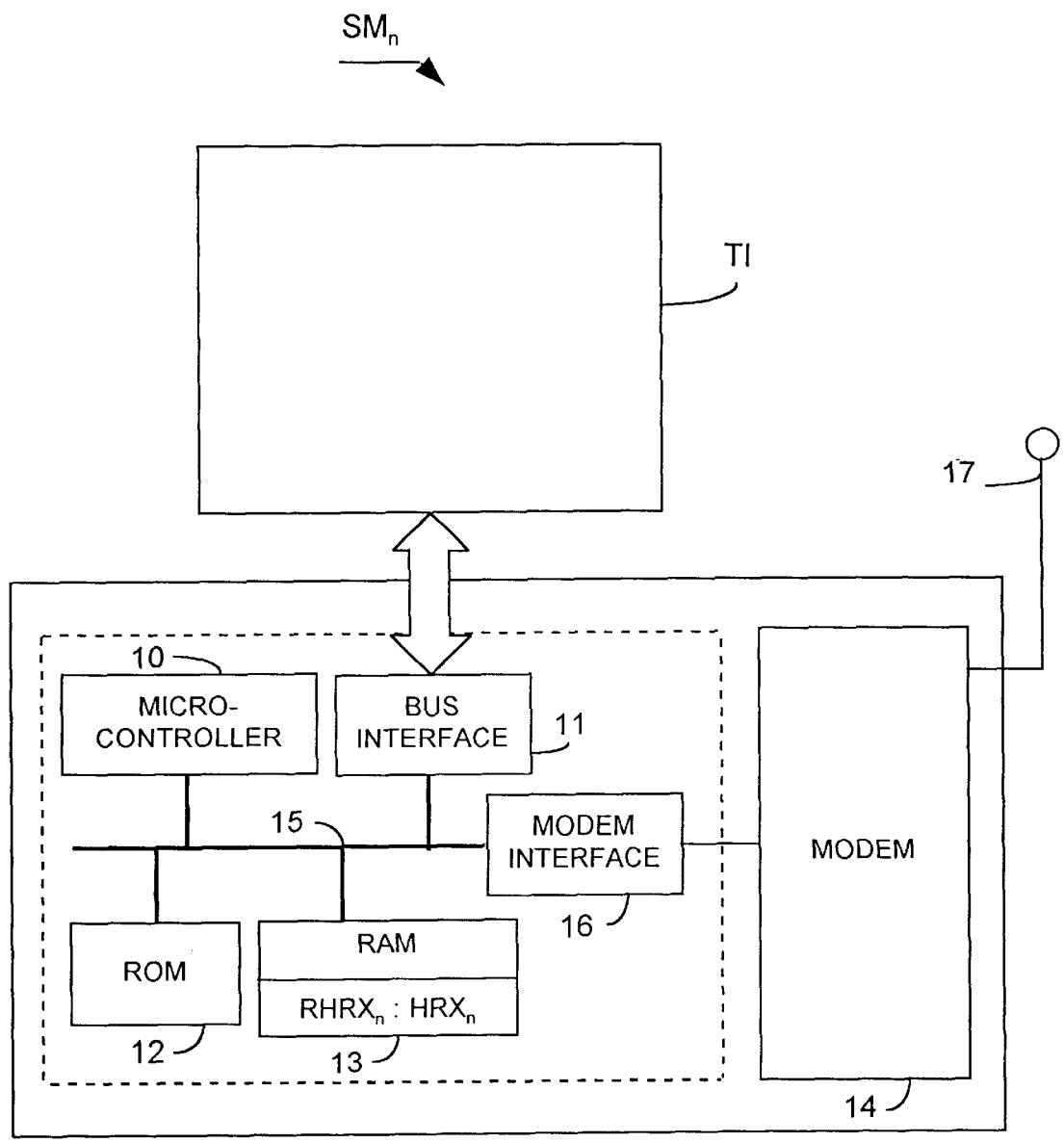
FIG. 3 is a block diagram of a mobile station included in the local network of FIG. 1.

According to the embodiment chosen and depicted in FIGS. 1 to 3, the invention applies to a local wireless network in which the resource to be shared is the transmission medium and the elements are communication means. A unicellular local network is considered here, the concern being with the problems of access allocation within the cell.

The network has a central communication means, in the form of a base station SB, and communication means, in the form of mobile stations $SM_1$ to $SM_N$, where N is an integer representing the maximum number of mobile stations which can be controlled by the base station. The number of mobile stations effectively connected to the network changes continuously.

The mobile stations exchange data with one another and with the base station, sharing the transmission medium, which here is radio. According to a first embodiment, which will be considered more particularly in the remainder of the description, the data exchanged between mobile stations pass through the base station, which receives the data from a "sending" mobile station and re-sends them to another "destination" mobile station. The passband allocated to the data exchange is conventionally divided into an inbound channel, for the data transmitted from the mobile stations to the base station, and an outbound channel, for the data transmitted from the base station to the mobile stations.

According to a second embodiment, the data exchanged between mobile stations are exchanged directly from one mobile station to another mobile station, the base station then only monitoring the data exchanges.

The data are exchanged in the form of data frames. The format of a data frame is fixed by the medium access control protocol implemented in the network. Besides frame and bit synchronisation fields, a data frame has fields in which are located the address of the station sending the frame, the address of the station for which the frame is intended, supplementary information, and a sequence of data.

The data sequence field may have a variable length, for example in the case of ETHERNET frames, between forty-six and around one thousand five hundred octets, so that consequently the frame has a variable length. The invention also applies when the length of the frames exchanged is fixed.

The radiocommunications are managed by the base station. The protocol for controlling access of the mobile stations to the network is a centralised polling type protocol. According to this protocol, the base station distributes, to the mobile stations, authorisations to send on the shared transmission medium, often called tokens, according to a specific order. When a mobile station receives the token, it may transmit data on the radio medium.

The base station SB has a microcontroller 1, a read-only memory (ROM) 2 and a random access memory (RAM) 3 connected to a modem 4 by a data bus 5, via a modem interface 6. The modem 4 transmits and receives data by means of an antenna 7. The modem provides conventional error detection and correction functions, which will not be described here.

The microcontroller 1 is a microprocessor or a specific integrated circuit. The microcontroller 1 controls the modem 4. The read-only memory 2 contains the program for operating the base station and for managing communications between mobile stations, this program being implemented by the microcontroller 1. The random access memory 3 stores the messages which are sent or received and has registers in which the variables used to implement the invention are stored. These variables will be described subsequently and the registers associated with them respectively bear the same references, to which the prefix "R" is added.

The mobile station $SM_n$, with n any number between 1 and N, has a computer terminal of personal computer type and a network communication means, conventionally in the form of a computer card integrated in the computer. The terminal may also be a printer, or a file server, for example.

As shown in FIG. 3, the mobile station communication means has a microcontroller 10, a read-only memory (ROM) 12 and a random access memory (RAM) 13 connected to a modem 14 by a data bus 15, via a modem interface 16. The modem 14 transmits and receives data by means of an antenna 17. The communication means also has a bus interface 11 which connects the network communication means to the application part of the computer terminal TI which processes the data which are received and to be sent via the communication means.

The random access memory has registers including the register $RHRX_n$ in which is stored the variable $HRX_n$ which will be detailed subsequently.

Figure 4:
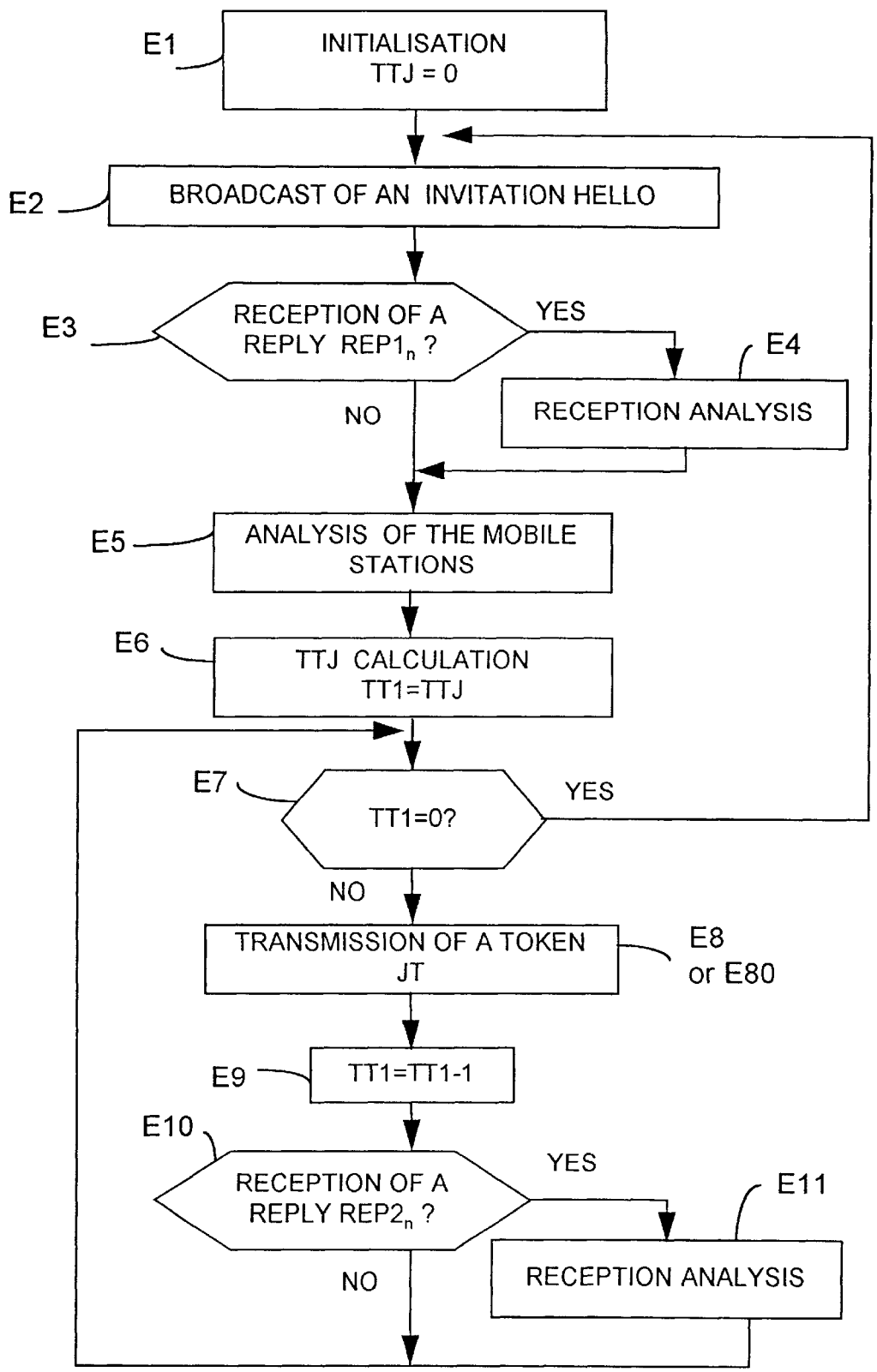
FIG. 4 is an algorithm according to the invention of the protocol for controlling access of the mobile stations to the network, implemented in the base station of FIG. 2.

With reference to FIG. 4, an algorithm for controlling access of the mobile stations to the network is stored in ROM memory 2 and implemented by the microcontroller 1 of the base station SB, and comprises steps E1 to E11. This algorithm determines the length of an access cycle, and includes the sending of invitations to declare oneself and authorisations (tokens) to send data, to the mobile stations.

An access cycle is made up of all the tokens to be distributed to the mobile stations, according to a specific order, between two invitations to declare oneself.

The step E1 is the initialisation of the base station, during which a variable TTJ, stored in a register RTTJ of the RAM memory 3 (FIG. 2), is initialised to 0. The variable TTJ is an integer number which represents the number of tokens to be sent in one access cycle, that is to say the length of the cycle.

The step E2 is the broadcast of an invitation to make oneself known HELLO frame, to all the mobile stations present in the cell, or radio coverage area of the base station.

The step E3 is a test of reception of a frame $REP1_n$ replying to the invitation HELLO. A mobile station $SM_n$ replies to an invitation HELLO with a frame having the structure described previously. The frame contains identification data, having notably the address $ADR_n$ of the mobile station $SM_n$, which identifies the mobile station uniquely in the network. When the reply $REP1_n$ is detected by the base station, it is analysed at the step E4, described in more detail subsequently.

When no reply is detected after a time delay at the step E3, or after the step E4, the algorithm goes to the step E5 of analysing the known mobile stations. The aim of this step is to delete from the list the mobile stations which have not sent any frame during a predetermined number of consecutive cycles. The step E5 is detailed subsequently.

The algorithm next goes to the step E6 of calculating the variable TTJ, according to the non-detection of a reply to the invitation to send signal HELLO, or the analysis of the reply REP1$_n$ performed at the step E4. A working variable TT1, stored in a register RTT1 of the memory 3 (FIG. 2), and used in following steps, is initialised to the value TTJ which has just been calculated. The step E6 is detailed subsequently.

The following step E7 is a test on the value of the variable TT1. If the variable TT1 is equal to zero, this means that the base station has no token to send, and the algorithm returns to the step E2.

The steps E2 to E7 are thus passed through in a loop as long as the variable TT1 is zero, that is to say as long as the length of the access cycle is zero. In other words, the steps E2 to E7 are passed through prior to an access cycle, or between two access cycles, or, according to a particular embodiment, between two groups of access cycles, containing a predetermined number of access cycles all having the same length.

Figure 10:
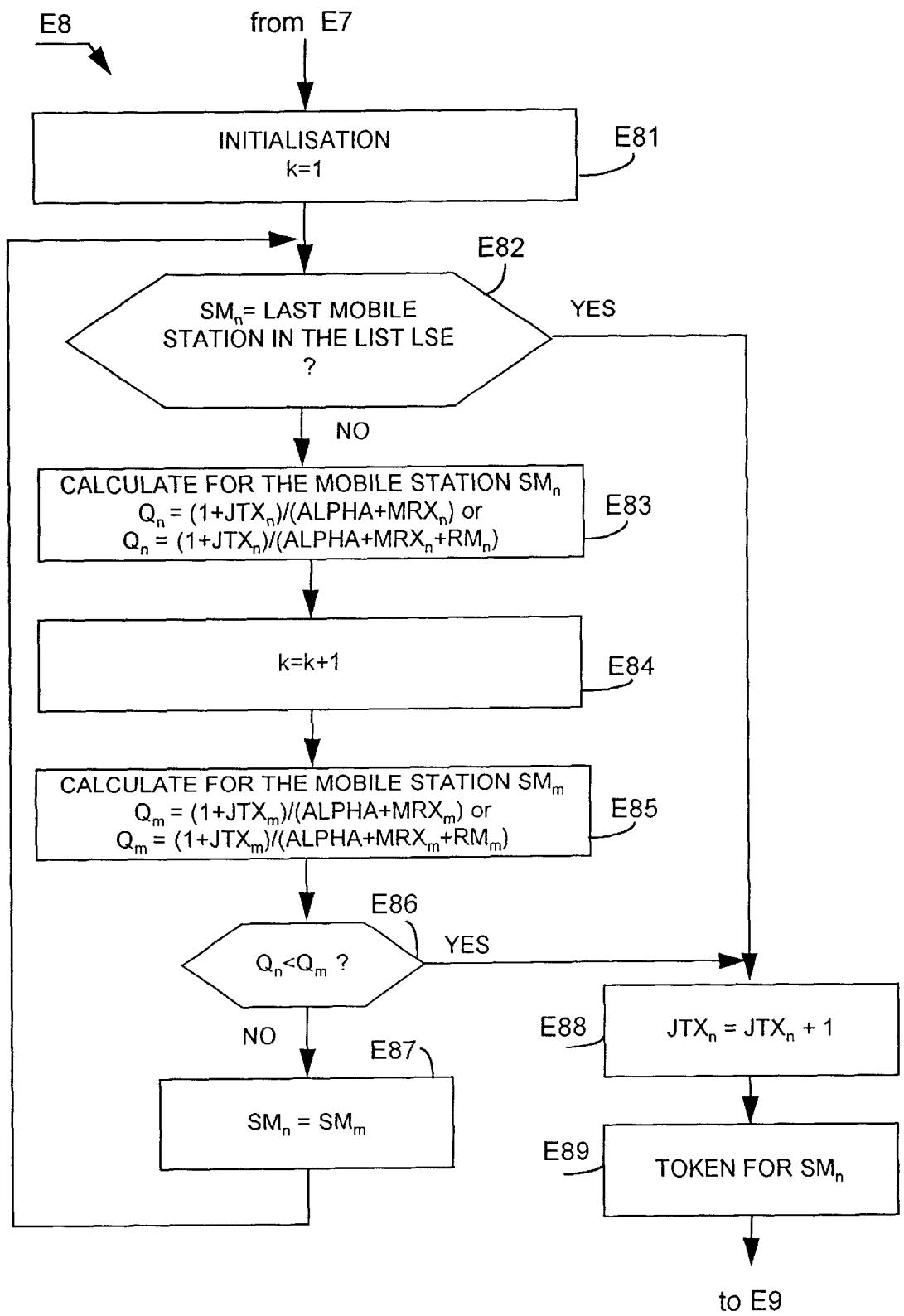
FIG. 10 is an algorithm, according to the first two embodiments of the invention, for distribution of authorisations to send to the mobile stations by the base station.

If the variable TT1 is non-zero, the base station SB sends an authorisation to send data, or token JT, to one of the mobile stations. The sending of a token JT is performed at the step E8 according to the first two embodiments of the invention, or at the step E80 according to the last two embodiments of the invention. The steps E8 and E80 are detailed subsequently with reference to FIGS. 10 and 11.

The variable TT1 is next decremented by one unit at the step E9.

At the step E10, a test is made as to whether a reply REP2$_n$ to the token sent JT has been received by the base station. When the reply to the test is positive, the received reply is analysed at the step E11, similar to the step E4 detailed subsequently. Where the data pass through the base station, the step E11 is followed by re-sending of the data by the base station, to the destination mobile station.

When the reply to the test of the step E10 is negative, or after the step E10, the algorithm returns to the step E7.

The steps E7 to E10 or E11 are passed through as long as the variable TT1 is non-zero, which corresponds to an access cycle.

Figure 5:
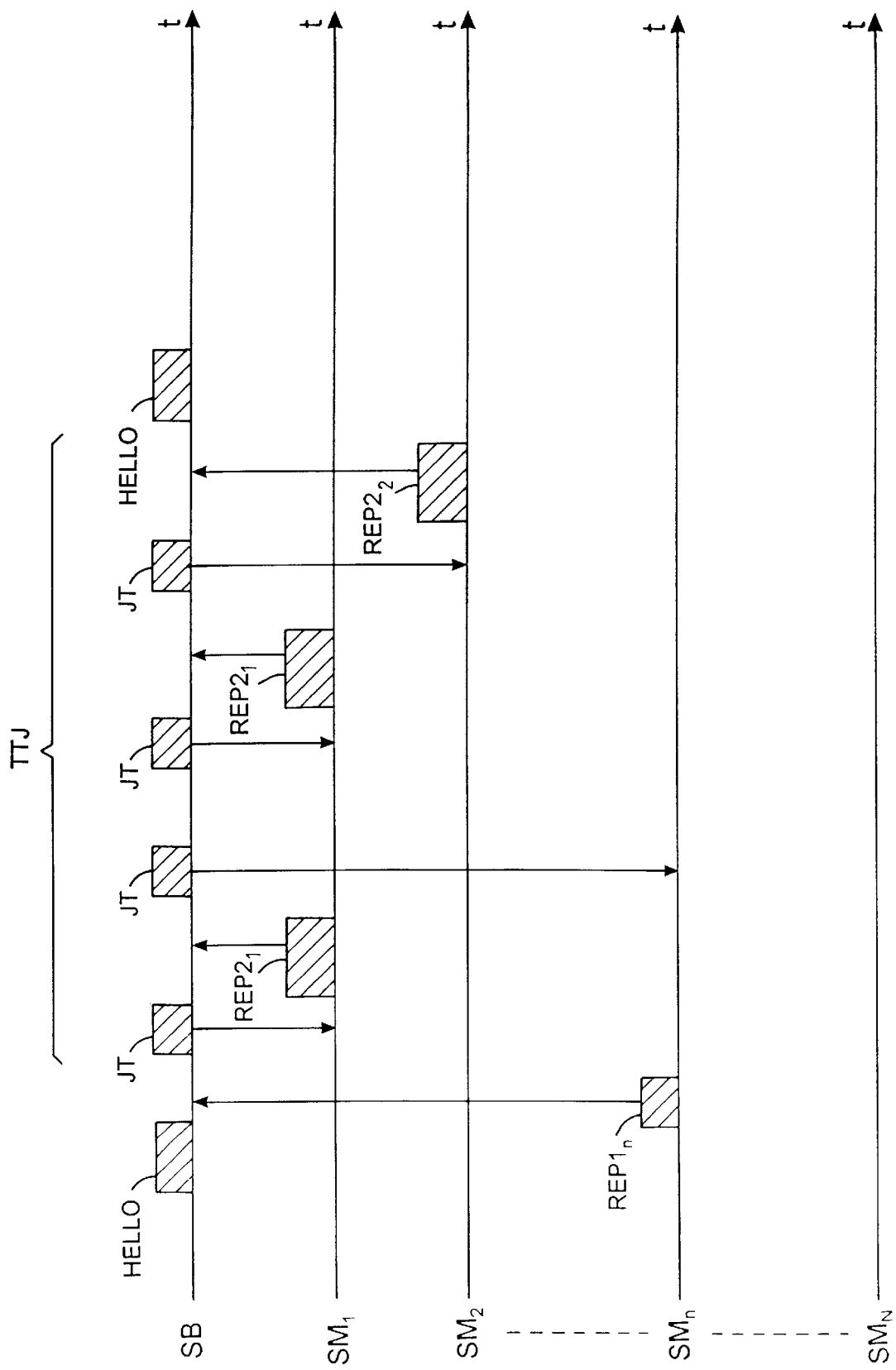
FIG. 5 is a timing diagram of the protocol for controlling access of the mobile stations to the network.

FIG. 5 depicts a simplified timing diagram of an access cycle of the access control protocol, flanked by invitations to declare oneself HELLO. The base station SB broadcasts an invitation to declare oneself HELLO to all the mobile stations, then analyses the reply or the absence of reply from a mobile station to the invitation HELLO. This phase corresponds to the steps E1 to E7. It is assumed here that this phase is situated between two access cycles, and that the variable TT1 calculated at the end of this phase (step E7) is non-zero.

The mobile stations liable to reply to an invitation HELLO are mobile stations which have just been powered up, and mobile stations which do not receive any authorisation to send JT after having received a predetermined number of successive invitations HELLO.

When a mobile station SM$_n$ replies to an invitation HELLO with a reply frame REP1$_n$, the base station starts an access cycle corresponding to the steps E7 to E10/E11, and sends a first authorisation to send token to the mobile station SM$_1$, which in reply sends a data frame REP2$_1$. The data are sent to the base station SB, which processes them and for example in its turn sends them to a destination mobile station.

The base station next sends a second token JT to the mobile station SM$_n$, which does not send any data frame in reply. After a time delay, the base station sends a token to the mobile station SM$_1$, which replies by sending a data frame REP2$_1$, and so on.

The cycle ends with the sending of a token JT to the mobile station SM$_2$, which replies thereto with a data frame REP2$_2$. The access cycle is followed by the broadcast of an invitation to declare oneself HELLO.

Figure 6:
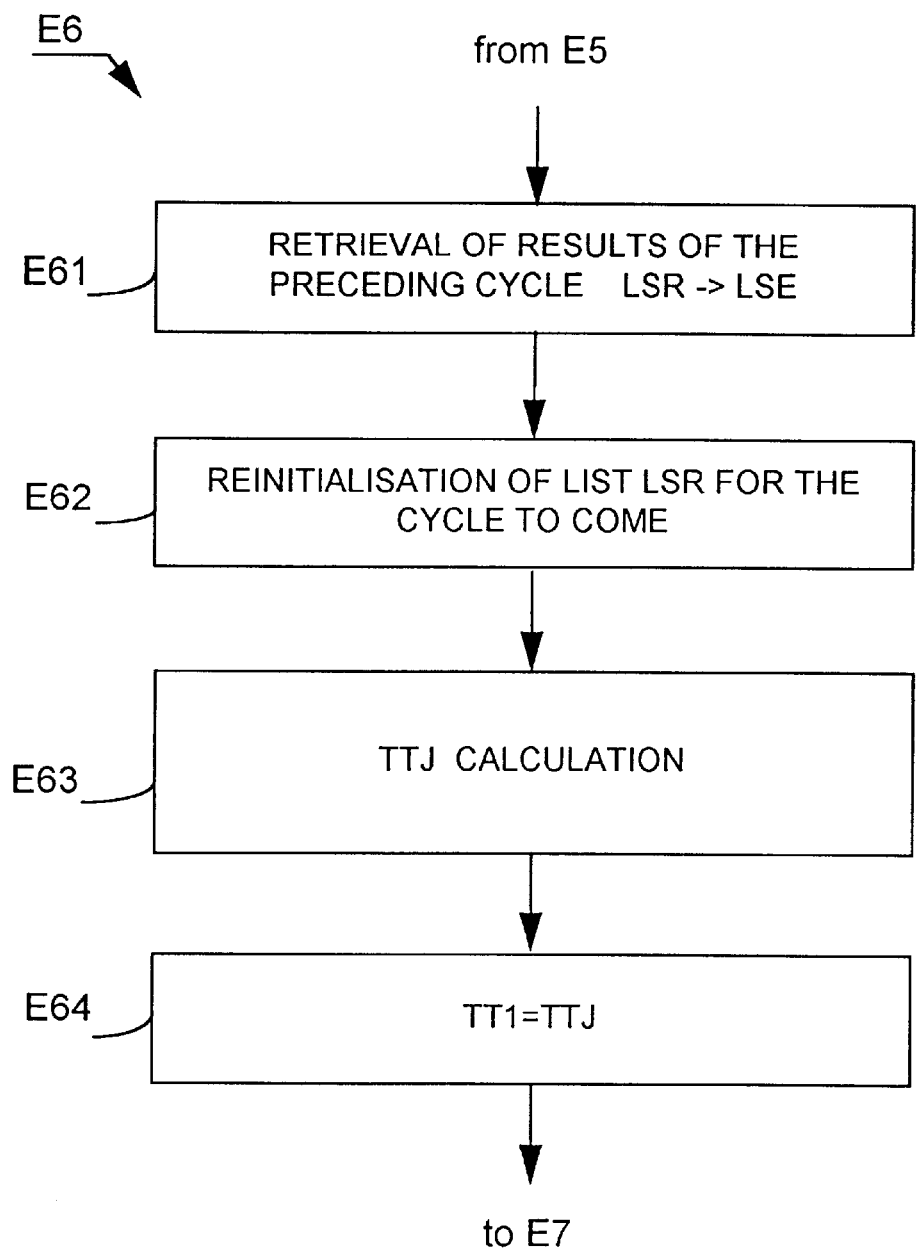
FIG. 6 is an algorithm according to the invention for calculating the length of an access cycle.

FIG. 6 depicts the step E6 of calculating the length of the access cycle. The step E6 is carried out prior to the access cycle and has sub-steps E61 to E64.

The step E61 is the retrieval of the mobile station control results obtained during the preceding cycle. These results are in the form of a list LSR and their retrieval consists of copying them into a list LSE. The lists LSE and LSR have the same structure, and are similar to one of four lists LS1, LS2, LS3 and LS4, corresponding to four embodiments, are illustrated in FIGS. 7A, 7B, 7C and 7D. As will be seen subsequently, the algorithm uses the two lists LSE and LSR, the data of which are stored in as many respective registers of the memory 3.

Where the step E61 is passed through prior to the first access cycle, for example just after powering-up of the base station, the retrieved result list is empty and corresponds to an imaginary "preceding cycle".

Each of these lists includes the known mobile stations. A mobile station is known if it has replied to an invitation to make oneself known HELLO, or to an authorisation to send JT during the preceding access cycle or during one of a predetermined number of preceding access cycles.

The list LS1 illustrated in FIG. 7A corresponds to a first embodiment and has by way of example four mobile stations, for which the following data are stored in respective registers of the memory 3 (FIG. 2):

the address ADR$_n$ of each mobile station known by the base station (register RADR$_n$). The address of a mobile station is an identifier serving to uniquely identify that mobile station.

the number MRX$_n$ of frames sent by each known mobile station and received by the base station, in reply to an invitation to declare oneself HELLO, or in reply to a token during an access cycle (register RMRX$_n$). A received frame is a frame received without error by the base station, the error detection and correction being carried out conventionally.

the number JTX$_n$ of tokens sent by the base station, during a cycle, to each known mobile station (register RJTX$_n$).

the number ACT$_n$ of consecutive cycles during which the mobile station SM$_n$ has not sent any frame (register RACT$_n$).

The mobile stations known by the base station are arranged in decreasing order of the number MRX$_n$, which corresponds to a decreasing order of priority. An order k is allotted to each mobile station arranged in the list (register Rk).

According to FIG. 7B, the list LS2 corresponds to a second embodiment, and has in addition to the elements of the list LS1:

the number RM$_n$ of frames awaiting transmission from each known mobile station (register RRM$_n$). The number RM$_n$ is transmitted by the mobile station under consideration, in the supplementary information field of a data frame.

The mobile stations known by the base station are arranged in decreasing order of the sum (MRX$_n$+RM$_n$), which corresponds to a decreasing order of priority. An order k is allotted to each mobile station arranged in the list.

According to FIG. 7C, the list LS3 corresponding to a third embodiment has in addition to the data in the list LS1:

the number $JGM_n$ of tokens sent by the base station, during a cycle, to all mobile stations of lower priority than each known mobile station (register $RJGM_n$).

The mobile stations known by the base station are arranged in decreasing order of the number $MRX_n$ (as for the list LS1 in FIG. 7A), which corresponds to a decreasing order of priority. An order k is allotted to each mobile station in the list.

The list LS4, illustrated in FIG. 7D, has all the preceding data for each mobile station known by the base station.

The mobile stations known by the base station are arranged in decreasing order of the sum $(MRX_n+RM_n)$ (as for the list LS2 in FIG. 7B), which corresponds to a decreasing order of priority. An order k is allotted to each mobile station in the list.

The following step E62 (FIG. 6) consists of replacing, for the next access cycle, the list LSR, retrieved at the step E61, of the mobile station control data, by another list LSR of the same known mobile stations, arranged according to the same order and with their parameter $ACT_n$, and for which the parameters $MRX_n$, $JTX_n$ (for all the lists), $RM_n$ (for the lists LS2 and LS4) and $JGM_n$ (for the lists LS3 and LS4) are all reinitialised to zero. The values of these parameters in this list will change during the progress of the following cycle. Only the address, the order and the parameter $ACT_n$ of the mobile stations are kept from one cycle to the next.

The step E63 is the calculation of the number TTJ of tokens JT to be sent for the access cycle to come. The number TTJ depends in general on the sum of the numbers $MRX_n$ of frames sent by each known mobile station during the preceding access cycle. For the embodiments which take into account the numbers $RM_n$ of frames awaiting transmission from each known mobile station, the number TTJ also depends on the sum of the numbers $RM_n$.

A weighting factor ALPHA is determined in order to limit the length of the cycle; this weighting factor is also taken into account for assigning tokens to the mobile stations, as detailed subsequently. The factor ALPHA is stored in a register RALPHA of the memory 3 (FIG. 2).

According to a preferred embodiment, the calculation is as follows:

$$TTJ=ENT((\Sigma MRX_n+\Sigma RM_n-1)/ALPHA)+K+1$$

where ENT( . . . ) denotes the integer part, K is an integer representing the number of known stations and ALPHA is calculated as follows:

if $(\Sigma\ MRX_n+\Sigma\ RM_n)$ is greater than or equal to 1, then:

$$ALPHA=ENT((\Sigma MRX_n+\Sigma RM_n-1)/f(K))+1$$

where f(K) is a number dependent on the number of known stations K, for example $f(K)=8\times K$, otherwise, ALPHA=1.

The number f(K) makes it possible to limit the interval between two tokens assigned to the same mobile station.

If TTJ is less than a number g(K) dependent on the number of known stations, for example g(K)=K, or if ALPHA is equal to 1, then:

$$TTJ=g(K).$$

If it is not wished to limit the length of the cycle, the factor ALPHA is chosen to be fixed at 1.

More generally, the formula for determining the number TTJ is:

$$TTJ=ENT((\Sigma MRX_n+\Sigma RM_n-1)/ALPHA)+K+1$$

In the preceding formula, the variable NS is an integer representing the number of successive and identical cycles which it is wished to send between two access cycle calculations. The number NS has a predetermined value typically between 1 and 10, or as a variant the number NS is equal to:

$$NS=ENT((g(K)-1)/(\Sigma MRX_n+\Sigma RM_n))+1$$

The variables NTE and NTR are weighting factors which make it possible to weight the respective influence of the sum of the numbers $MRX_n$ and of the numbers $RM_n$.

In every case, for the embodiments which do not take into account the numbers $RM_n$, the term $(\Sigma\ RM_n)$ remains zero in the preceding calculation formulae.

According to another embodiment, only the term $(\Sigma\ RM_n)$ is taken into account for determining the number TTJ. In other words, the factor NTR is zero.

According to yet another embodiment, the number TTJ is fixed and predetermined.

The following step E64 is the initialisation of the variable TT1 to the value of the number TTJ which has just been calculated. The algorithm next goes to the step E7 described previously.

Figure 8:
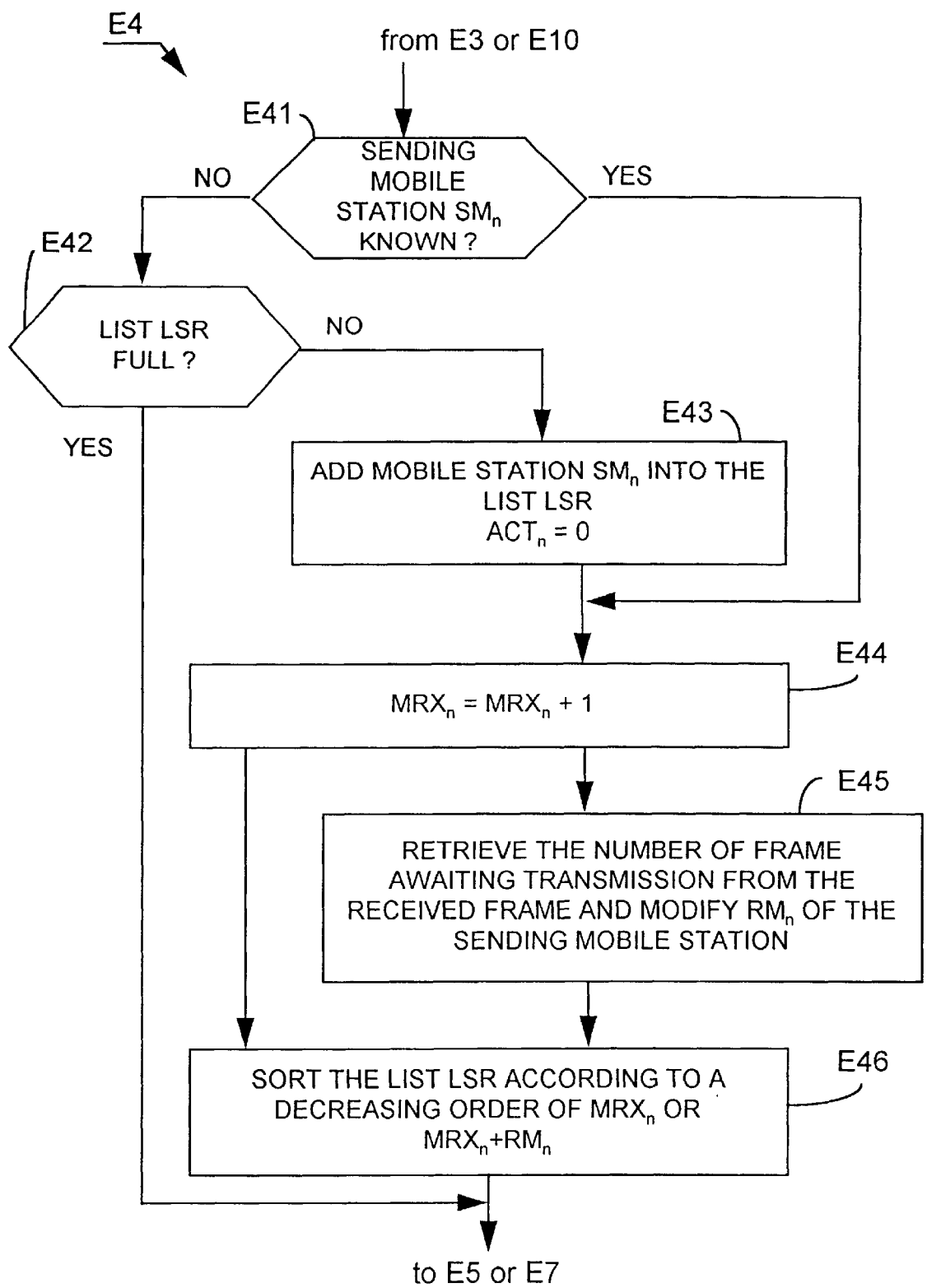
FIG. 8 is an algorithm according to the invention for analysing a frame received by the base station.

With reference to FIG. 8, the step E4 of analysing the reception of a frame $REP1_n$ replying to an invitation HELLO comprises sub-steps E41 to E46. The step E4 is passed through when the base station SB receives a reply frame $REP1_n$ from a mobile station $SM_n$, after having broadcast an invitation to make oneself known HELLO.

The step E41 is a test of checking the presence or absence of the mobile station $SM_n$ which replied to the invitation HELLO in the list LSR of known mobile stations.

When the reply at the step E41 is negative, the algorithm goes to the step E42 to check whether the list LSR of known mobile stations is completely full or not. This is because, for reasons of memory size, the number of mobile stations controlled by the base station is limited to the predetermined number N. If this limiting number is reached, the mobile station under consideration is not added to the list and the algorithm goes to the step E5. In the contrary case, the algorithm goes to the step E43 to add the mobile station under consideration $SM_n$ to the list LSR of mobile stations known and controlled by the base station SB. The mobile station under consideration is added at the end of the list; its parameters, notably the parameter $ACT_n$, are initialised to zero.

The step E43 is followed by the step E44. Likewise, in the case of a positive reply at the step E41, that is to say if the mobile station $SM_n$ is known, the step E41 is followed by the step E44.

At the step E44, the number $MRX_n$ of frames sent by the mobile station under consideration $SM_n$ is incremented by one unit.

According to the first and third embodiments, corresponding more particularly to the lists LS1 and LS3 depicted in FIGS. 7A and 7C, the step E44 is followed by the step E46, at which the list LSR of mobile stations known and controlled by the base station is arranged according to a decreasing order of the numbers $MRX_n$ of messages sent by each mobile station in the list.

According to the second and fourth embodiments, corresponding more particularly to the lists LS2 and LS4 depicted in FIGS. 7B and 7D, the mobile station $SM_n$ transmits the number $RM_n$ of frames awaiting transmission in the supplementary information field of the frame $REP1_n$ replying to the invitation HELLO. The step E44 is then followed by the step E45, at which the number $RM_n$ of frames awaiting transmission is retrieved from the received reply $REP1_n$. The number $RM_n$ of the station under consideration, stored in the list LSR, is next replaced by the number of waiting frames contained in the reply $REP1_n$. The step E45 is next followed by the step E46 in which the list LSR of mobile stations known and controlled by the base station is arranged according to a decreasing order of the sums of the numbers $(MRX_n+RM_n)$ of each mobile station in the list.

In all the embodiments, the algorithm next goes to the step E5.

The step E11 (FIG. 4) of analysing a reply $REP2_n$ to a token JT is similar to the step E4. The step E11 is passed through between the steps E10 and E7.

Figure 9:
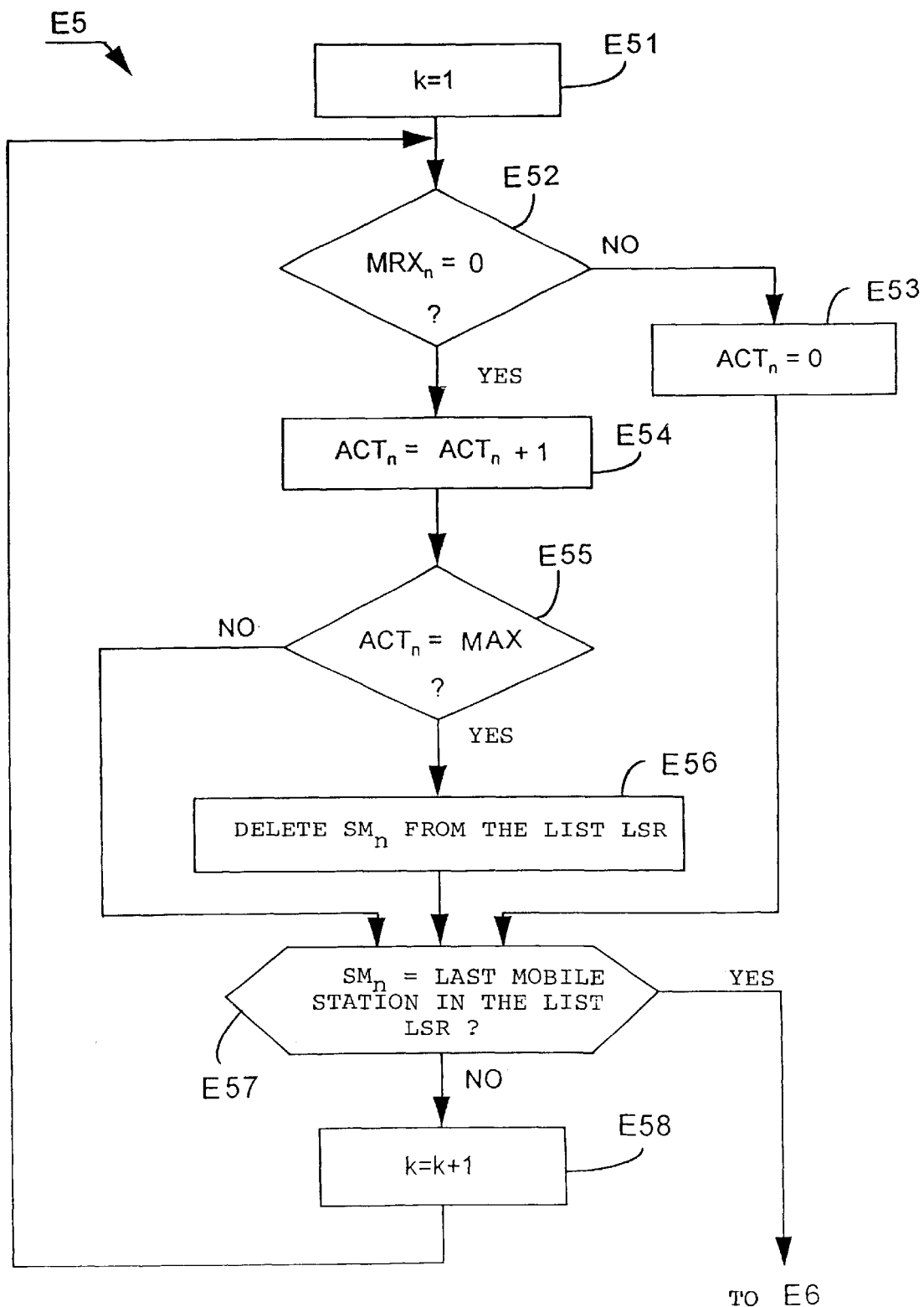
FIG. 9 is an algorithm according to the invention for analysing known mobile stations.

The step E5 of analysing the known mobile stations has sub-steps E51 to E58 detailed with reference to FIG. 9. Each known mobile station is analysed to determine whether it is to remain in the list LSR of known mobile stations, or if it is to be discarded therefrom. A mobile station is discarded from the list LSR if it has not sent any frame during a predetermined number of consecutive cycles.

The step E51 is the initialisation of the variable k to 1 in order to test the first mobile station $SM_n$ in the list.

The step E52 is a test on the value of the number $MRX_n$. If the number $MRX_n$ is not zero, this means that the mobile station $SM_n$ has sent at least one frame during the preceding access cycle. The parameter $ACT_n$ is then reinitialised to zero at the step E53 and the algorithm goes to the step E57 detailed subsequently.

At the step E52, if the number $MRX_n$ is zero, this means that the mobile station has not sent any frame during the preceding cycle, and the algorithm goes to the step E54 in order to increment the parameter $ACT_n$ by one unit.

The following step E55 is a test on the value of the parameter $ACT_n$. If the parameter $ACT_n$ reaches a predetermined value MAX, then the mobile station $SM_n$ has not sent any frame during the number MAX of access cycles. The mobile station $SM_n$ is deleted from the list LSR of known mobile stations at the step E56. The algorithm next goes to the step E57.

If at the step E55 the parameter $ACT_n$ has not reached the value MAX, then the algorithm goes to the step E57.

The step E57 tests whether the mobile station $SM_n$ is the last in the list LSR. If this is not the case, the parameter k is incremented by one at the step E58 in order to move to the next mobile station in the list, and the algorithm returns to the step E52.

When all the mobile stations in the list LSR have been tested, that is to say when the reply is positive at the step E57, then the algorithm goes to the step E6 described previously (FIG. 6).

In the case of the first and second embodiments, corresponding to the lists LS1 and LS2, the step E8 determines to which mobile station in the list LSE the token JT will be transmitted and includes the transmission of a token JT. The step E8 is passed through during the access cycle, for each token JT sent, and has sub-steps E81 to E89 detailed with reference to FIG. 10.

Overall, the step E8 consists, for each token JT to be sent, of comparing the mobile stations in the list LSE according to a criterion in order to decide to which mobile station the token JT will be allotted. The criterion is a quotient between the number $JTX_n$ of tokens sent by the base station to the mobile station $SM_n$ during the current cycle, and the number $MRX_n$ of frames sent by the mobile station $SM_n$ during the preceding cycle. The token is assigned to the mobile station having the smallest quotient.

At the step E81, the variable k of order in the list LSE of mobile stations known and controlled by the base station SB is initialised to one. The mobile station $SM_n$ of order k is then considered. The first mobile station considered is thus the one which has the highest priority, since the list LSE is arranged as seen previously. In other words, the mobile station having the largest number $MRX_n$, or the largest sum $(MRX_n+RM_n)$, is considered first of all.

The step E82 is a test for checking whether the mobile station $SM_n$ is the last station in the list LSE.

When the reply at the step E82 is negative, the algorithm goes to the step E83 of calculating the quotient $Q_n$ for the mobile station $SM_n$. For the first embodiment, the quotient $Q_n$ is equal to $(1+JTX_n)/(ALPHA+MRX_n)$. For the second embodiment, the number $MRX_n$ is replaced by the sum $(MRX_n+RM_n)$ and the quotient $Q_n$ is then equal to $(1+JTX_n)/(ALPHA+MRX_n+RM_n)$. The quotient $Q_n$ is stored in a register $RQ_n$ of the memory 3 (FIG. 2).

The weighting factor ALPHA was calculated at the step E63, and plays a part in the assigning of the token JT in order to ensure that all mobile stations in the list LSE will have at least one token JT during the cycle.

According to a simplified embodiment, the weighting factor ALPHA is replaced by a predetermined value, for example the value 1.

At the step E84, the variable k is incremented by one unit, and the next mobile station $SM_m$ in the list is considered.

The step E85 consists of calculating the quotient $Q_m$ for the next station $SM_m$. As at the step E83, calculation of the quotient $Q_m$ depends on the embodiment. For the first embodiment, the quotient $Q_m$ is equal to $(1+JTX_m)/(ALPHA+MRX_m)$. For the second embodiment, the number $MRX_m$ is replaced by the sum $(MRX_m+RM_m)$ taking into account the number of frames which the mobile station $SM_m$ has still to transmit, and the quotient $Q_m$ is equal to $(1+JTX_m)/(ALPHA+MRX_m+RM_m)$. The quotient $Q_m$ is stored in a register $RQ_m$ of the memory 3 (FIG. 2).

According to the simplified embodiment, the factor ALPHA is replaced by the value 1.

The step E86 is the comparison of the two quotients $Q_n$ and $Q_m$ calculated previously. When the quotient $Q_n$ is less than the quotient $Q_m$, then the algorithm goes to the step E88 at which the number $JTX_n$ is incremented by one unit.

The following step E89 is the sending by the base station SB of a token JT to the mobile station $SM_n$. The algorithm next goes to the step E9 described previously.

When the reply at the step E86 is negative, that is to say the quotient $Q_n$ is greater than the quotient $Q_m$, the algorithm goes to the step E87, at which the mobile station under consideration $SM_n$ is replaced by the mobile station $SM_m$. The step E87 is followed by the step E82.

Where the mobile station $SM_n$ is the last in the list, that is to say the reply at the step E82 is positive, the algorithm goes to the step E88 in order to increment the number $JTX_n$, then to the step E89 to send a token to the mobile station $SM_n$. The algorithm next goes to the step E9 described previously.

Figure 11:
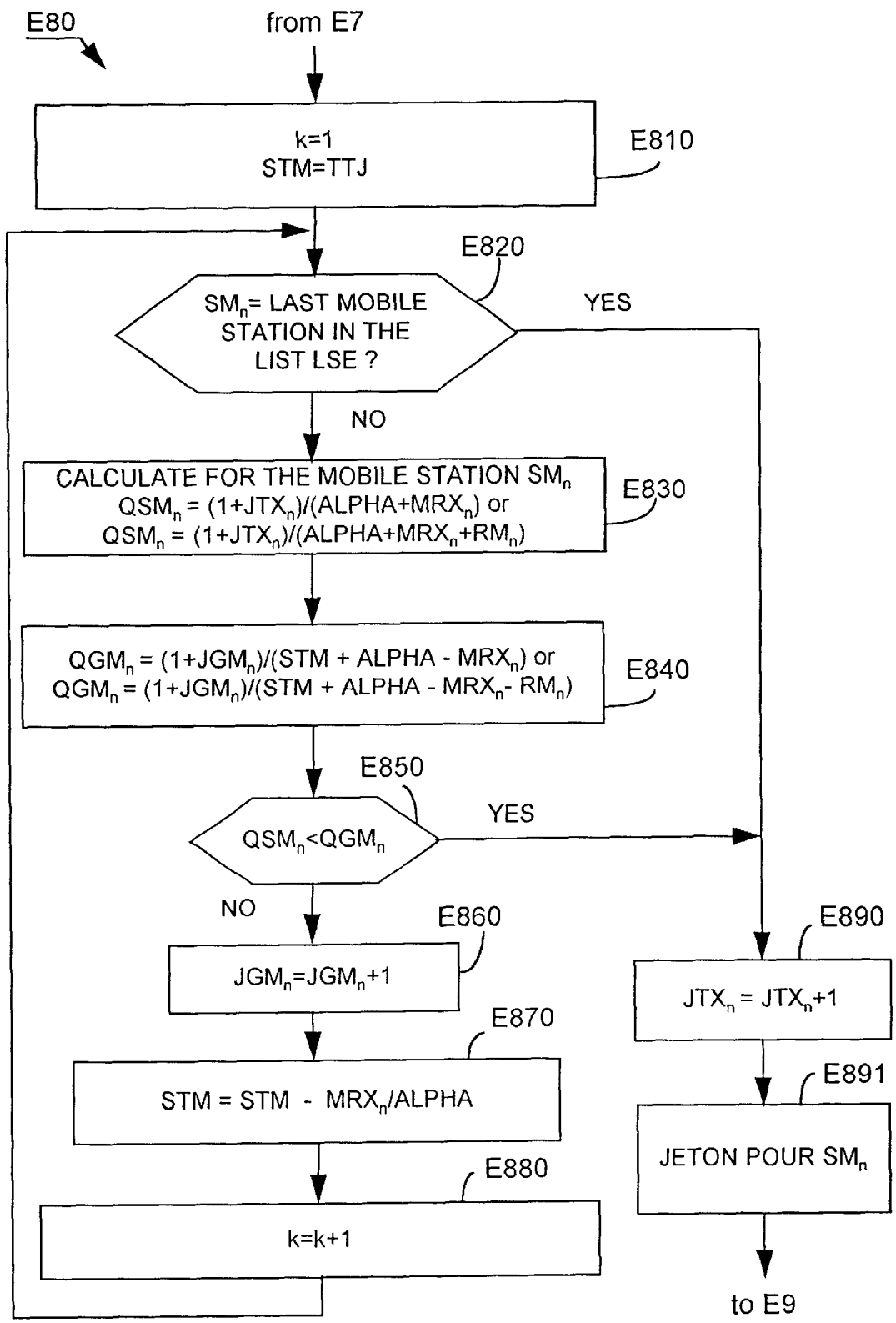
FIG. 11 is an algorithm, according to the last two embodiments of the invention, for distribution of authorisations to send to the mobile stations by the base station.

In the third and fourth embodiments, corresponding to the lists LS3 and LS4, the token distribution step E80, illustrated in FIG. 11, is passed through during the access cycle, for each token JT sent, and comprises steps E810 to E891.

According to these two embodiments, a mobile station is compared with a group of mobile stations, which here is all the mobile stations of lower priority than the mobile station under consideration. The comparison is performed between the quotient of the number $JTX_n$ and the number $MRX_n$, on the one hand, and the quotient of the number $JGM_n$ and the number of tokens sent by the mobile station during the preceding cycle, to the mobile stations of the group under consideration, here the group of mobile stations of lower priority, on the other hand.

These two embodiments have a better regularity of token distribution to the mobile stations. In particular, when mobile stations have very different traffic from one another, that is to say transmit data at very different throughputs from one another, the mobile stations having the lowest traffic are better distributed in the cycle than in the two preceding embodiments.

The step E810 is the initialisation of the variable k to the value one, and of a variable STM to the value of the number TTJ calculated at the step E6 which preceded the current cycle. The variable STM is stored in a register RSTM of the memory 3 (FIG. 2).

The first mobile station considered is thus the one which has the highest priority, since the list LSE is arranged as seen previously. In other words, the mobile station having the largest number $MRX_n$, or the largest sum $(MRX_n+RM_n)$ is considered first of all.

The variable k represents the order in the list LSE of mobile stations controlled by the base station SB, and corresponds to the mobile station $SM_n$. The variable STM is a number of tokens to be sent by the mobile station during the current cycle, to a mobile station under consideration and in the set of mobile stations in the list LSE, having a lower priority than the mobile station under consideration.

The following step E820 tests whether the mobile station $SM_n$ of order k is the last in the list LSE.

When the mobile station under consideration $SM_n$ is the last in the list, that is to say the reply is positive at the step E820, the algorithm goes to the step E890 at which the number $JTX_n$ is incremented by one unit.

The following step E891 is the sending of a token to the mobile station $SM_n$. The algorithm next goes to the step E9.

When the reply at the step E820 is negative, the step E830 calculates the quotient $QSM_n$, which is equal to $(1+JTX_n)/(ALPHA+MRX_n)$ in the case of the third embodiment, and to $(1+JTX_n)/(ALPHA+MRX_n+RM_n)$ in the case of the fourth embodiment. The quotient $QSM_n$ is stored in a register $RQSM_n$ of the memory 3 (FIG. 2).

The weighting factor ALPHA was calculated at the step E63, and plays a part in the assigning of the token JT in order to ensure that all mobile stations in the list will have at least one token JT during the cycle.

According to a simplified embodiment, the weighting factor ALPHA is replaced by a predetermined value, for example the value 1.

The following step E840 calculates the quotient $QGM_n$, which is equal to $(1+JGM_n)/(STM+ALPHA-MRX_n)$ in the case of the third embodiment, and to $(1+JGM_n)/(STM+ALPHA-MRX_n-RM_n)$ in the case of the fourth embodiment. The quotient $QGM_n$ is stored in a register $RQGM_n$ of the memory 3 (FIG. 2).

The step E850 is a test to compare the value of the quotient $QSM_n$ with that of the quotient $QGM_n$.

When the quotient $QSM_n$ is greater than the quotient $QGM_n$, the algorithm goes to the step E860, which is the incrementing by one unit of the variable $JGM_n$.

At the following step E870, the number STM is decremented by the value $MRX_n$/ALPHA.

The algorithm next goes to the step E880, at which the variable k is incremented by one unit. The mobile station under consideration is then the next station in the list LSE of mobile stations controlled by the base station. The algorithm returns to the step E820.

When the quotient $QSM_n$ is less than the quotient $QGM_n$ at the step E850, the algorithm goes to the step E890 described previously and the token JT is assigned to the mobile station $SM_n$ at the step E891.

In the four embodiments, the calculations necessary for assigning the access authorisations are distributed over the whole of the current cycle; there is thus no calculation time between two cycles. As a variant, all the calculations for assigning access authorisations and the storing of the results may be carried out prior to the cycle.

Figure 12:
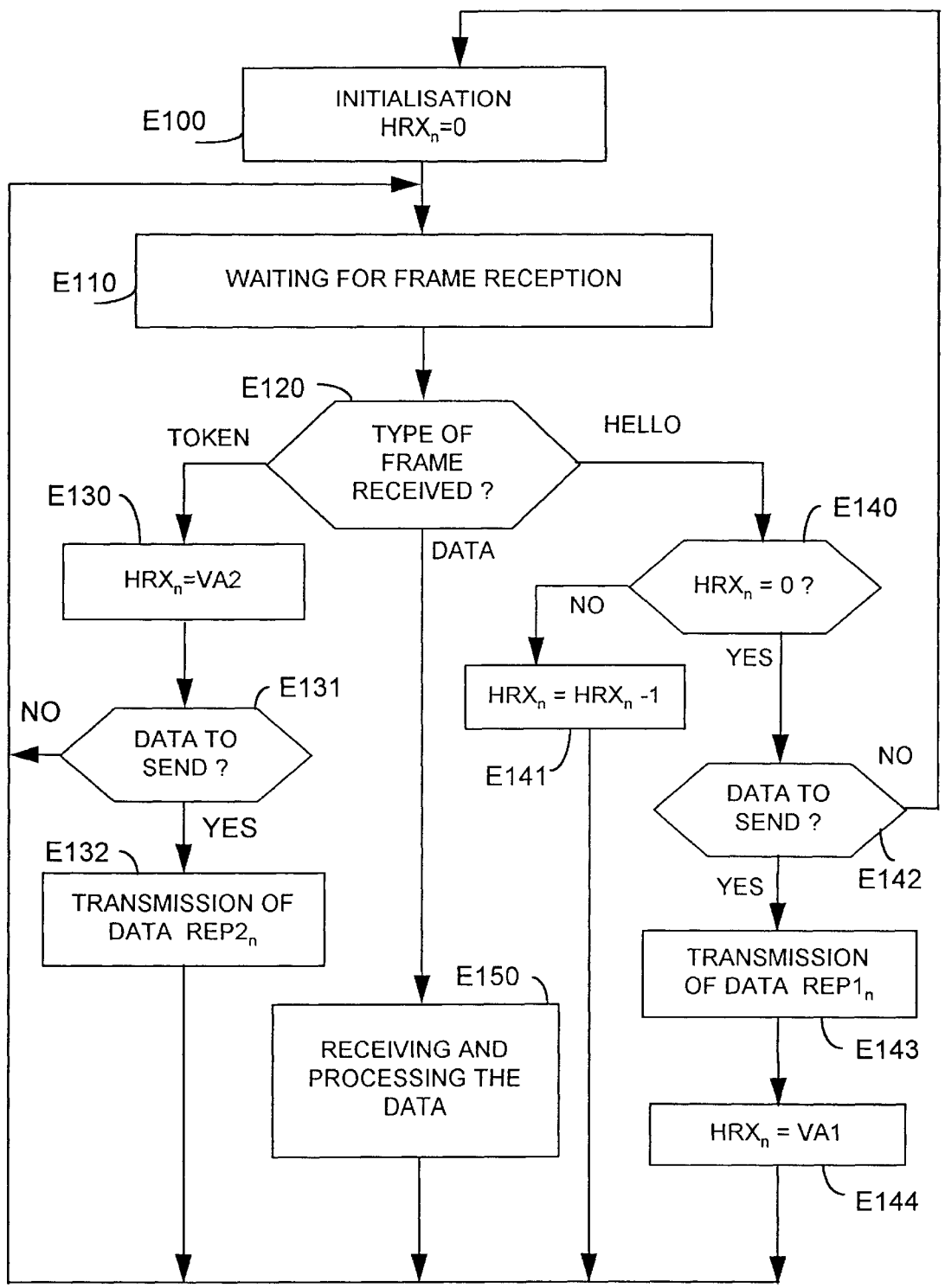
FIG. 12 is an algorithm according to the invention for managing sending and receiving of data in a mobile station.

FIG. 12 depicts the algorithm for operating a mobile station $SM_n$, concerning the reception of an invitation to make oneself known HELLO, a token JT or data which are neither an invitation HELLO, nor a token JT. This algorithm is stored in ROM memory 12 and is implemented by the microcontroller 10 (FIG. 3).

The algorithm has steps E100 to E150. The step E100 is the initialisation of the mobile station $SM_n$, for example after it has been powered-up. A variable $HRX_n$ is initialised to zero; the variable $HRX_n$ is an integer representing the number of consecutive invitations to make oneself known HELLO which the mobile station $SM_n$ must receive, without having received a token, before replying to an invitation HELLO in order to make itself known. The variable $HRX_n$ is intended to avoid the collisions which could exist if two mobile stations reply to the same invitation to make itself known HELLO. The variable $HRX_n$ is stored in a register $RHRX_n$ of the memory 13 (FIG. 3). The following step E110 is the wait for the reception of a frame from the modem 14. The mobile station $SM_n$ is liable to receive an invitation to make oneself known HELLO, an authorisation to send JT, or a frame of any data being neither an invitation HELLO, nor a token JT. When the mobile station receives a frame, the algorithm goes to the step E120 to analyse what type of frame is indicated in the supplementary information field of the received frame.

If the mobile station receives a token JT, the algorithm goes to the step E130 to reinitialise the number $HRX_n$ to a random value VA2, between 1 and 10 for example, then to the step E131 to test whether the mobile station $SM_n$ has data to transmit. When the mobile station has data to transmit, these are transferred into the RAM memory 13, and the microcontroller 10 is informed when such a transfer of data to be sent is finished.

If the reply at the step E131 is negative, then the algorithm returns to the step E110. If the reply at the step E131 is positive, the algorithm goes to the data transmission step E132. The data transmission is carried out in the form of a transmission of frame $REP2_n$ to the base station SB. The algorithm next returns to the step E110.

If the mobile station $SM_n$ receives an invitation HELLO (step E120), the algorithm goes to the step E140 to check whether the number $HRX_n$ is equal to zero. If the reply is negative, then the algorithm goes to the step E141 to decrement the number $HRX_n$ by one unit, then the algorithm returns to the step E110.

When the reply at the step E140 is positive, the algorithm goes to the step E142 to test whether the mobile station $SM_n$ has data to transmit. If the reply is negative, the mobile station $SM_n$ has no data to send and the algorithm returns to the initialisation step E100.

If the reply at the step E142 is positive, the mobile station $SM_n$ has data to send and the algorithm goes to the data transmission step E143. The step E143 consists of the sending of a data frame $REP1_n$ in reply to the frame HELLO.

The following step E144 is the reinitialisation of the number $HRX_n$ to a random value VA1, between 1 and 10 for example. The algorithm next returns to the step E110 to wait for the next frame reception.

If the mobile station receives data (step E120), the algorithm goes to the step E150 of receiving and processing the received data. The algorithm next returns to the step E110 to wait for the next frame reception.

Of course, the present invention is in no way limited to the embodiments described and depicted, but on the contrary encompasses any variant within the capability of persons skilled in the art.

In particular, the invention applies to a local cabled network.

The invention applies equally in a real time kernel for allocating to tasks, or programs, authorisations for access to a processor.

The invention also applies for allocating to electronic circuits, such as a processor, or memories, authorisations for access to a data bus.

What is claimed is:

1. A method for allocating, to a plurality of elements, authorisations for access to a shared resource, including the step of storing the address of elements capable of accessing the shared resource, comprising the steps of:
   determining, for the plurality of elements, a number of authorisations for access to the resource, the authorisations together forming an access cycle, wherein the number of access authorisations is weighted by a weighting factor which depends on the sum of the number of accesses to the shared resource which each element made during the preceding access cycle,
   successively assigning each of the authorisations to the elements during the access cycle, an access authorisation being assigned to an element according to at least the number of times the element under consideration accessed the resource during the preceding access cycle, and
   storing the number of times each element accesses the resource during the access cycle.

2. A method according to claim 1, wherein the number of access authorisations is limited at a lower value by a value dependent on the number of elements capable of accessing the resource.

3. A method according to claim 1, wherein the number of access authorisations is weighted by a weighting factor which depends on the sum of the number of accesses to the shared resource which each element made during the preceding access cycle, and the number of accesses which each element had still to make at the end of the preceding access cycle.

4. A method according to claim 1, wherein said step of determining the number of access authorisations is carried out between two access cycles.

5. A method according to claim 1, wherein said assigning step includes comparing the elements according to a criterion which depends on the number of authorisations previously assigned to each element during that access cycle, and the number of times each element accessed the resource during the preceding access cycle.

6. A method according to claim 1, wherein said assigning step includes, for each access authorisation,
   calculating, for each element, the ratio between the number of access authorisations previously assigned to the said element during the current access cycle, and the number of accesses to the shared resource which the said element made during the preceding access cycle,
   comparing the ratios calculated previously, and
   assigning the access authorisation to the element for which the ratio is the smallest.

7. A method according to claim 1, wherein said assigning step includes, for each access authorisation,
   calculating, for each element, the ratio between the number of access authorisations previously assigned to that element during the current access cycle, and the sum of the number of accesses to the shared resource which that element made during the preceding access cycle and the number of accesses which that element had still to make at the end of the preceding access cycle,
   comparing the ratios calculated previously, and
   assigning the access authorisation to the element for which the ratio is the smallest.

8. A method according to claim 1, wherein said assigning step includes, for each access authorisation,
   calculating, for one of the elements, a first ratio between the number of access authorisations previously assigned to that element during the current access cycle, and the number of accesses to the shared resource which that element made during the preceding access cycle,
   calculating, for that element, a second ratio between the number of access authorisations previously assigned to the elements of a group not including that element, during the current access cycle, and the number of accesses to the shared resource which the elements of the group made during the preceding access cycle,
   comparing the first and second ratios calculated previously, and
   assigning the access authorisation to that element if the first ratio is less than the second ratio or, if not, reiterating the preceding steps for another element selected from the group.

9. A method according to claim 1, wherein said assigning step includes, for each access authorisation,
   calculating, for one of the elements, a first ratio between the number of access authorisations previously assigned to that element during the current access cycle, and the sum of the number of accesses to the shared resource which that element made during the preceding access cycle and the number of accesses which that element had still to make at the end of the preceding access cycle,
   calculating, for that element, a second ratio between the number of access authorisations previously assigned to the elements of a group not including the said element, during the current access cycle, and the difference between the number of accesses to the shared resource which the elements of the group made during the preceding access cycle, and the number of accesses which that element had still to make at the end of the preceding access cycle,
   comparing the first and second ratios calculated previously, and
   assigning the access authorisation to that element if the first ratio is less than the second ratio or, if not, reiterating the preceding steps for another element selected from the group.

10. A method according to claim 8, wherein the group includes elements which accessed the resource during the preceding cycle a number of times fewer than that of that element.

11. A method according to claim 1, further comprising the steps of:

broadcasting invitations to declare oneself to the elements, receiving a reply from an element capable of accessing the shared resource and of which the address is not stored, and storing the address of that element.

12. A method according to claim 1, further comprising the step of:

deleting from the memory means the address of elements for which the number of accesses to the shared resource is zero for a specific number of consecutive access cycles.

13. A method according to claim 1, in which the elements are data communication means, and the shared resource is a communication channel.

14. A device for allocating, to a plurality of elements, authorisations for access to a shared resource, having a memory means for storing the address of elements capable of accessing the shared resource, comprising:

means for determining, for the plurality of elements, a number of authorisations for access to the resource, the authorisations together forming an access cycle, said determining means being adapted to weight the number of access authorisations by a weighting factor which depends on the sum of the number of accesses to the shared resource which each element made during the preceding access cycle, means for successively assigning each of the authorisations to the elements, during the access cycle, an access authorisation being assigned to an element according to at least the number of times the element under consideration accessed the resource during the preceding access cycle, and means for storing the number of times each element accesses the resource during the access cycle.

15. A device for allocating, to a plurality of elements, authorisations for access to a shared resource, adapted to cooperate with a memory means for storing the address of elements capable of accessing the shared resource, comprising logic means having:

means for determining, for the plurality of elements, a number of authorisations for access to the resource, the authorisations together forming an access cycle, said determining means being adapted to weight the number of access authorisations by a weighting factor which depends on the sum of the number of accesses to the shared resource which each element made during the preceding access cycle, means for successively assigning each of the authorisations to the elements, during the access cycle, an access authorisation being assigned to an element according to at least the number of times the element under consideration accessed the resource during the preceding access cycle, and means for cooperating with memory means adapted to store the number of times each element accesses the resource during the access cycle.

16. A device according to claim 14, wherein the determining means are adapted to limit the number of access authorizations at a lower value by a value dependent on the number of elements capable of accessing the resource.

17. A device according to claim 14, wherein the determining means are adapted to weight the number of access authorisations by a weighting factor which depends on the sum of the number of accesses to the shared resource which each element made during the preceding access cycle, and the number of accesses which each element had still to make at the end of the preceding access cycle.

18. A device according to claim 14, wherein the determining means are adapted to determine the number of access authorisations between two access cycles.

19. A device according to claim 14, wherein the assigning means are adapted to compare the elements according to a criterion which depends on the number of authorisations previously assigned to each element during the access cycle, and the number of times each element accessed the resource during the preceding access cycle.

20. A device according to claim 14, wherein the assigning means are adapted, for each access authorisation, to:

calculate, for each element, the ratio between the number of access authorisations previously assigned to that element during the current access cycle, and the number of accesses to the shared resource which that element made during the preceding access cycle, compare the ratios calculated previously, and assign the access authorisation to the element for which the ratio is the smallest.

21. A device according to claim 14, wherein the assigning means are adapted, for each access authorisation, to:

calculate, for each element, the ratio between the number of access authorisations previously assigned to that element during the current access cycle, and resource which that element made during the preceding access cycle and the number of accesses which that element had still to make at the end of the preceding access cycle, compare the ratios calculated previously, and assign the access authorisation to the element for which the ratio is the smallest.

22. A device according to claim 14, wherein the assigning means are adapted, for each access authorisation, to:

calculate, for one of the elements, a first ratio between the number of access authorisations previously assigned to that element during the current access cycle, and the number of accesses to the shared resource which that element made during the preceding access cycle, calculate, for that element, a second ratio between the number of access authorisations previously assigned to the elements of a group not including that element, during the current access cycle, and the number of accesses to the shared resource which the elements of the group made during the preceding access cycle, compare the first and second ratios calculated previously, and assign the access authorisation to the said element if the first ratio is less than the second ratio or, if not, reiterate the preceding steps for another element selected from the group.

23. A device according to claim 14, wherein the assigning means are adapted, for each access authorisation, to:

calculate, for one of the elements, a first ratio previously assigned to that element during the current cycle, and the sum of the number of accesses to the shared resource which that element made during the preceding access cycle and the number of accesses which that element had still to make at the end of the preceding access cycle, calculate, for that element, a second ratio between the number of access authorisations previously assigned to the elements of a group not including that element, during the current access cycle, and the difference between the number of accesses to the shared resource which the elements of the group made during the preceding access cycle, and the number of accesses which the said element had still to make at the end of the preceding access cycle, compare the first and second ratios calculated previously, and assign the access authorisation to the said element if the first ratio is less than the second ratio or, if not, reiterate the preceding steps for another element selected from the group.

24. A device according to claim 22, wherein the group includes elements which accessed the resource during the preceding access cycle a number of times fewer than that of the said element.

25. A device according to claim 14, further comprising:

means for broadcasting invitations to declare oneself to the elements, means for receiving a reply from an element capable of accessing the shared resource and of which the address is not stored, and means for storing the address of the said element.

26. A device according to claim 14, further comprising:

means for deleting from the memory means the address of elements for which the number of accesses to the shared resource is zero for a specific number of consecutive access cycles.

27. A device according to claim 14, in which the elements are data communication means, and the shared resource is a communication channel.

28. A device according to claim 14, wherein the determining, assigning and storing means are incorporated in:

a microcontroller, a read-only memory having a program for allocating, to a plurality of elements, authorisations for access to a shared resource, and a random access memory having registers adapted to record variables modified during the execution of the program.

29. A device according to claim 15, wherein the logic means are incorporated in:

a microcontroller, and a read-only memory having a program for allocating, to a plurality of elements, authorisations for access to a shared resource, and wherein the logic means cooperate with a random access memory having registers adapted to record variables modified during the execution of the program.

* * * * *

UNITED STATES PATENT AND TRADEMARK OFFICE
CERTIFICATE OF CORRECTION

PATENT NO.  : 6,400,726 B1
DATED       : June 4, 2002
INVENTOR(S) : Philippe Piret et al.

It is certified that error appears in the above-identified patent and that said Letters Patent is hereby corrected as shown below:

Drawings,
Sheet 12 of 13, Fig. 11 "JETRON POUR $SM_n$" should read -- TOKEN FOR $SM_n$ --.

Column 2,
Line 59, delete "possibly combined:".

Column 6,
Line 66, "ste' ES" should read -- step E5 --.

Column 14,
Line 28, "The" should read -- ¶ The --.

Column 18,
Line 26, "and resource" should read -- and the sum of the number of accesser to the shared resource --.

Signed and Sealed this

Twenty-fifth Day of March, 2003

JAMES E. ROGAN
*Director of the United States Patent and Trademark Office*